June 14, 1960 C. F. CHANDLER 2,941,031

COLOR KILLER APPARATUS FOR TELEVISION RECEIVERS

Filed Feb. 13, 1956 5 Sheets-Sheet 1

INVENTOR.
CARROLL F. CHANDLER
BY Lippincott & Smith
ATTORNEYS

June 14, 1960 C. F. CHANDLER 2,941,031

COLOR KILLER APPARATUS FOR TELEVISION RECEIVERS

Filed Feb. 13, 1956 5 Sheets-Sheet 2

INVENTOR.
CARROLL F. CHANDLER
BY Lippincott + Smith
ATTORNEYS

June 14, 1960 C. F. CHANDLER 2,941,031

COLOR KILLER APPARATUS FOR TELEVISION RECEIVERS

Filed Feb. 13, 1956 5 Sheets-Sheet 3

INVENTOR.
CARROLL F. CHANDLER
BY Lippincott & Smith
ATTORNEYS

June 14, 1960 C. F. CHANDLER 2,941,031
COLOR KILLER APPARATUS FOR TELEVISION RECEIVERS
Filed Feb. 13, 1956 5 Sheets-Sheet 4

INVENTOR.
CARROLL F. CHANDLER
BY Lippincott & Smith
ATTORNEYS

COLOR KILLER APPARATUS FOR TELEVISION RECEIVERS

Filed Feb. 13, 1956 5 Sheets-Sheet 5

INVENTOR.
CARROLL F. CHANDLER
BY Lippincott & Smith
ATTORNEYS

United States Patent Office 2,941,031

Patented June 14, 1960

2,941,031

COLOR KILLER APPARATUS FOR TELEVISION RECEIVERS

Carroll F. Chandler, Palo Alto, Calif., assignor to Admiral Corporation, Chicago, Ill., a corporation of Delaware Filed Feb. 13, 1956, Ser. No. 565,092

16 Claims. (Cl. 178—5.4)

This invention relates to color television receivers that can also receive monochrome television signals, and in particular to improved color killers that provide better picture quality during reception of monochrome signals.

In compatible color and monochrome television systems, as exemplified by current American television broadcasting standards, it is imperative that the color television receiver also be used to receive with substantially like efficiency either color television signals or monochrome television signals, depending upon which is transmitted. Color television receivers usually have separate luminance and chrominance video channels for processing and transmitting to the picture tube luminance and chrominance components of the picture signal. Such receivers are well known to those skilled in the art, and have been described in numerous publications. For example, a simplified description may be found in an article entitled "The ABC's of Color Television" by J. M. Barstow, published in the Proceedings of the IRE, November 1955, pages 1574 through 1579.

Monochrome or "black-and-white" television picture signals do not contain chrominance components. Consequently, the chrominance channel of a color television receiver serves no useful function during monochrome reception. But "noise" transmitted through the chrominance channel may seriously impair the quality of the monochrome picture. In fact, such noise is particularly objectionable during monochrome reception since it may produce colored "noise" in the monochrome picture. To eliminate this colored "noise" and thereby to improve the picture quality during monochrome reception, it is desirable to provide in color television receivers a color killer that automatically cuts off the chrominance channel while monochrome television signals are being received.

Color killers have been used prior to the present invention, but prior automatic color killers have been unreliable in operation. In particular, prior color killers have failed to operate reliably during reception of weak monochrome television signals having a low signal-to-noise ratio, which is the very time when cutting off of the chrominance channel is most essential to satisfactory picture quality. Accordingly, an object of this invention is to provide an improved automatic color killer that operates reliably during reception of weak television signals having low signal-to-noise ratios, as well as during reception of stronger color television signals.

Heretofore, automatic operation of a color killer has usually been controlled by a control voltage derived from any asymmetric tap in the color phase detector of the receiver that provides a negative voltage to cut off the color killer responsive to the color bursts of received color television signals. Unfortunately, "noise" also produces a negative voltage at this tap. Even under conditions of good reception providing a strong color television signal, it has been found in practice that the color bursts may be as much as 20 decibels below normal in amplitude relative to other components of the picture signal. Consequently, to insure cutting off of color killer during reception of such color television signals, the cut-off level of the color killer must be adjusted to a fairly small negative value of the control voltage.

During the reception of weak monochrome television signals having a low signal-to-noise ratio, the automatic gain control of the receiver operates to increase the signal amplification for maintaining a satisfactory video signal level. The "noise" is also amplified, and produces in the prior-art apparatus a large negative control voltage that cuts off the color killer and permits the transmission of noise through the chrominance channel to the picture tube under these conditions, which is the time when such noise is most objectionable. Accordingly, another object of this invention is to provide improved means for deriving a color killer control voltage that is substantially unresponsive to "noise."

Other objects and advantages of the invention will appear as the description proceeds.

Briefly stated, in accordance with certain aspects of this invention, a control voltage for the color killer is derived from a separate balanced or phase detector which also may be considered as a phase discriminator. Electric pulses of opposite polarity are supplied to two balanced input terminals of the detector in synchronism with the horizontal flyback pulses provided in the scanning system of the receiver. The detector is so arranged that these electric pulses in themselves have no substantial effect upon the output voltage of the detector, but they do render the detector responsive to other signals during the occurrence of the pulses, while the detector is unresponsive to such other signals during intervals between the pulses.

Conventional demodulators of the receiver supply to the picture tube three color signals for producing a tricolor picture presentation. One of these color signals, representing blue-minus-luminance values and generally designated ($E'_B—E'_Y$), includes demodulated color bursts of negative polarity during the reception of color television signals. This color signal is supplied to an unbalanced input terminal of the aforesaid detector, and in response to this signal the detector supplies a negative control voltage that cuts off the color killer.

In a preferred form, the detector for supplying a color killer control voltage includes two capacitors connected to the balanced input terminals of the detector, two diode rectifiers connected in series with like polarities between the two capacitors, and two resistors connected in series between the two capacitors. The demodulated color burst is supplied to the connection between the two rectifiers, and the color killer control voltage appears at the connection between the two resistors.

The invention will be better understood from the following detailed description taken in connection with the accompanying drawings, and its scope will be pointed out in the appended claims. In the drawings:

Figure 1:
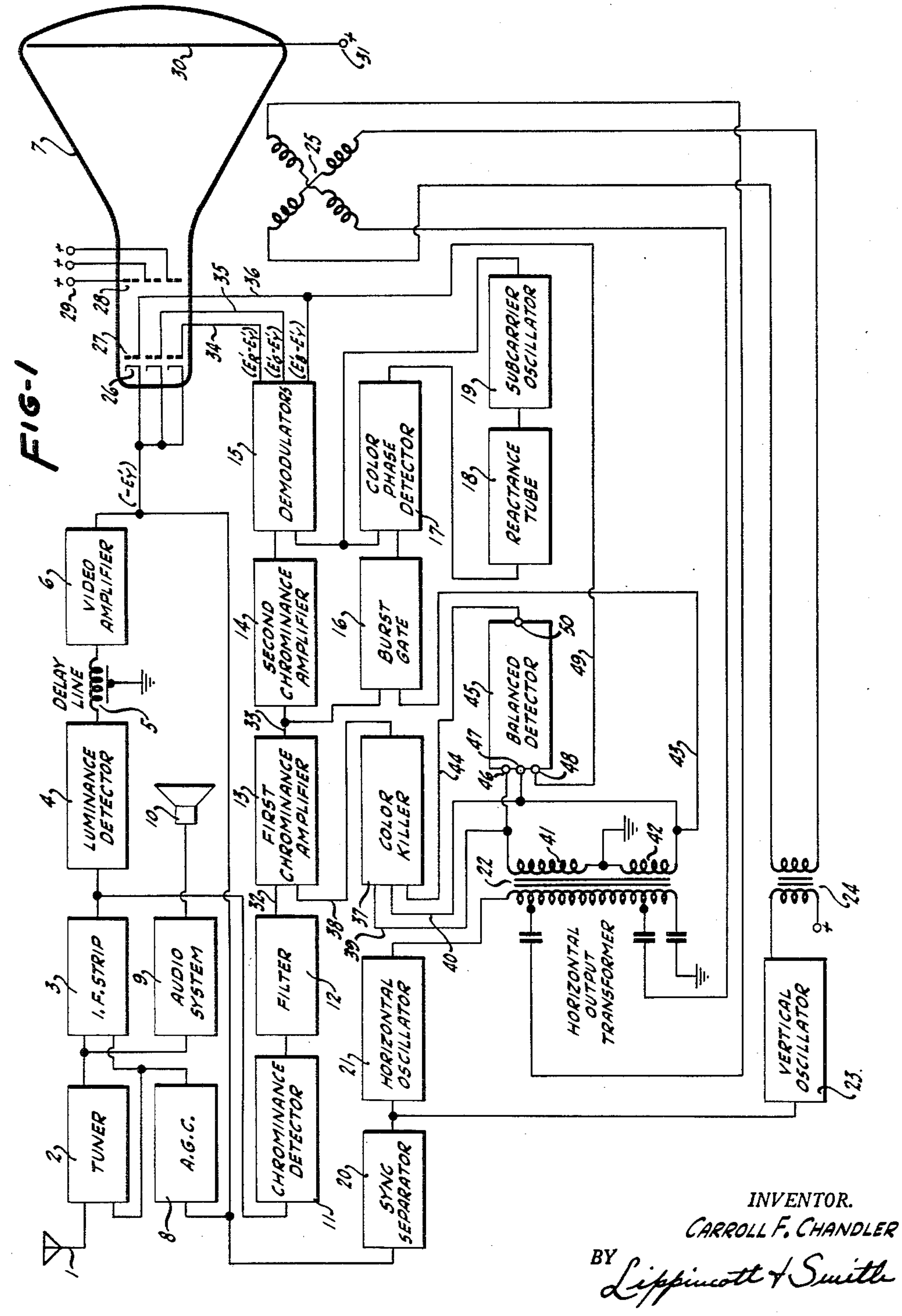
Fig. 1 is a schematic block diagram of a color television receiver including color killer apparatus embodying principles of this invention.

It should be understood that the curves shown in the drawings are merely illustrative of principles to be explained, and are not necessarily exact as to scale and waveform details.

Referring now to Fig. 1 of the drawings, a color television receiver includes a conventional antenna 1, tuner 2, I.F. strip 3, luminance detector 4, delay line 5, video amplifier 6, picture tube 7, automatic gain control or A.G.C. 8, audio system 9, loud-speaker 10, chrominance detector 11, filter 12, first chrominance amplifier 13, second chrominance amplifier 14, demodulators 15, burst gate 16, color phase detector 17, reactance tube 18, subcarrier oscillator 19, sync separator 20, horizontal oscillator 21, horizontal output transformer 22, vertical oscillator 23, vertical output transformer 24, and a deflection yoke 25. Such color television receivers are well known to those skilled in the art, and the fundamental principles thereof are explained in the article "The ABC's of Color Television" hereinbefore identified.

Picture tube 7 may be of the well-known three-gun type having a separate electron gun for each of the three primary colors red, blue and green. Each electron gun has a cathode 26, a control electrode 27, and one or more accelerating electrodes 28. The accelerating electrodes are connected to a suitable source of positive potential, indicated in the drawing by terminals 29. On or near the large end face of the picture tube, there is a phosphor screen comprising dots or strips of three different phosphors respectively adapted to emit light of the three primary colors when excited by electron bombardment. An anode 30 may be an electron permeable metallic film coated on the back side of the phosphor screen. Anode 30 is maintained at a high positive potential supplied by any suitable source indicated in the drawing by terminal 31. The picture tube also includes a shadow mask or some equivalent device (not shown) so constructed and arranged that the electron beam from one of the guns strikes only phosphors adapted to emit red light, while the electron beam from a second one of the guns strikes only phosphors adapted to emit green light and the electron beam from the third one of the guns strikes only phosphors adapted to emit blue light.

A television signal received at antenna 1 is amplified and reduced in frequency by tuner 2, is further amplified by I.F. strip 3, and is supplied to luminance detector 4 and to chrominance detector 11. The audio portion of the received signal is detected and amplified by audio system 9 and supplied to loud-speaker 10.

Luminance components of the composite picture signal are detected by luminance detector 4, and transmitted through delay line 5 and video amplifier 6 to the cathodes of the three electron guns. According to conventional notaaion used by those skilled in the art, the luminance components are represented by the symbol ($E'_Y$). Since the luminance components are supplied to the cathodes rather than the control grids of the electron guns in the particular receiver illustrated, they are herein represented by the symbol ($-E'_Y$). The luminance components of the picture signal are also supplied to A.G.C. 8 which controls the amplification of the tuner or the I.F. strip, or both, to maintain the video signal level at a satisfactory value.

The ($-E'_Y$) signal includes horizontal and vertical synchronizing pulses. This signal is supplied to the sync separator 20 which supplies the horizontal synchronizing pulses to horizontal oscillator 21 and the vertical synchronizing pulses to vertical oscillator 23. Horizontal oscillator 21, which includes the horizontal output amplifier, supplies to horizontal output transformer 22 current having an approximately sawtooth waveform synchronized with the horizontal synchronizing pulses. The voltage across transformer 22 has a waveform containing substantially rectangular pulses herein called horizontal flyback pulses, synchronized with the horizontal synchronizing pulses of the received picture signal. Taps on transformer 22 are connected to the horizontal deflection coils of yoke 25 to produce line scanning of the raster area by the three electron beams of the picture tube. Vertical oscillator 23, which includes the vertical output amplifier, supplies to vertical output transformer 24 current having an approximately sawtooth waveform synchronized with the vertical synchronizing pulses of the television signal. The secondary of transformer 24 is connected to the vertical deflection coils of yoke 25 to produce field scanning of the raster area by the three electron beams.

Chrominance components of the composite color picture signal are detected by chrominance detector 11 and supplied to a filter 12 that transmits the chrominance components and eliminates other portions of the picture signal. From filter 12, the chrominance components are transmitted through lead 32 to the first chrominance amplifier 13, which supplies the amplified chrominance components through lead 33 to the second chrominance amplifier 14 and to the burst gate 16. The chrominance components include color bursts transmitted on the "back porch" of the horizontal synchronizing pulses. Burst gate 16 transmits the color bursts to color phase detector 17, which controls reactance tube 18 to regulate the phase of oscillations produced by subcarrier oscillator 19.

Demodulators 15 are responsive to the amplitude of the chrominance signal and its phase relative to the oscillations produced by subcarrier oscillator 19, and supply through leads 34, 35 and 36 three color signals which, according to conventional terminology used by those skilled in the art, are respectively designated, ($E'_R-E'_Y$), ($E'_G-E'_Y$) and ($E'_B-E'_Y$). The ($E'_R-E'_Y$) signal is supplied to the control electrode of the electron gun that produces the electron beam which strikes phosphors adapted to emit red light, the ($E'_G-E'_Y$) signal is supplied to the control electrode of the electron gun that produces the electron beam which strikes phosphors adapted to emit green light, and the ($E'_B-E'_Y$) signal is supplied to the control electrode of the electron gun that produces the electron beam which strikes phosphors adapted to emit blue light. As a result, the currents of the three electron beams are respectively functions of ($E'_R$), ($E'_G$) and ($E'_B$), and light of the three primary colors is produced in proper proportions to synthesize the various colors of a color television picture.

Since luminance components of the composite picture signal are transmitted to the picture tube by luminance detector 4, delay line 5, and video amplifier 6, these components may collectively be referred to as the luminance channel. Since chrominance components of the picture signal are transmitted to the picture tube by chrominance detector 11, filter 12, chrominance amplifiers 13 and 14, and modulators 15, these components may collectively be referred to as the chrominance channel.

During reception of monochrome television signals, luminance components are transmitted to the picture tube through the luminance channel in the same manner as during reception of color television pictures. Monochrome television signals contain no chrominance components, and therefore under ideal conditions during reception of monochrome signals the three color signals ($E'_R-E'_Y$), ($E'_G-E'_Y$), and ($E'_B-E'_Y$) are of zero amplitude. Consequently, the chrominance channel serves no useful purpose during monochrome reception. However, noise accompanying the received signal may be transmitted by both the luminance and the chrominance channels, and as a result of noise transmission through two channels the picture quality may be substantially poorer than it would be in a good monochrome television receiver during reception of the same television signals. The noise transmitted through the chrominance channel of a color television receiver during reception of monochrome television signals is especially objectionable since it may produce colored "noise" displayed on the screen of the picture tube.

The portions of the color television receiver shown in Fig. 1 that have been described thus far are conventional, and are typical of current color television receivers. It should be understood that various modifications in these portions of the receiver, including the substitution of different types of picture tubes, are immaterial to the present invention. The invention of this patent application relates to an improved color killer for cutting off the chrominance channel of the receiver during monochrome reception to improve the picture quality by preventing the transmission of noise to the picture tube through the chrominance channel.

During reception of monochrome television signals, color killer 37 supplies through lead 38 to first chrominance amplifier 13 a negative bias voltage that cuts off the first chrominance amplifier, except during horizontal flyback as hereinafter explained, and thereby cuts off the chrominance channel to prevent the transmission of noise through this channel to the picture tube. For purposes hereinafter explained, electric pulses of opposite polarity synchronized with the horizontal flyback pulses are supplied to the color killer through leads 39 and 40. These pulses may be derived from secondaries 41 and 42 of horizontal output transformer 22. Preferably secondaries 41 and 42 are connected in series, and the connection between the two secondaries grounded, as shown. Secondary 42 may also supply through lead 43 pulses for operating burst gate 16.

During reception of color television signals, color killer 37 is cut off by a negative control voltage supplied through lead 44. It has been common practice heretofore to derive this control voltage from an asymmetric tap of color phase detector 17, but in this case noise has an appreciable effect upon the magnitude of the control voltage, especially during reception of weak monochrome television signals having a low signal-to-noise ratio. Consequently, prior color killers have been unreliable in operation and have failed to cut off the chrominance channel during reception of weak monochrome television signals when noise transmitted through the chrominance channel is most objectionable.

In accordance with the present invention, the control voltage supplied to the color killer through lead 44 is provided by a separate balanced or phase detector 45 which may also be considered as a phase discriminator. Electric pulses of opposite polarity synchronized with the horizontal flyback pulses are supplied to a pair of balanced input terminals 46 and 47 of detector 45 by connections to secondaries 41 and 42 of the horizontal output transformer. A color signal that includes demodulated color bursts of negative polarity is supplied to an unbalanced input terminal 48 of detector 45 through a lead 49 from demodulators 15. Detector 45 provides at its output terminal 50 a voltage having a negative value that is related to the amplitude of the demodulated color bursts supplied to input terminal 48. Noise has little effect upon the value of the voltage at terminal 50. Lead 44 is connected to output terminal 50 of the detector, and supplies the detector output voltage to the color killer as a control voltage to cut off the color killer during reception of color television signals.

According to current American color television broadcasting standards, the color burst has a phase angle of 180 degrees relative to reference phase, while the $(E'_B)$ signal has a phase angle of 347 degrees relative to reference phase. Thus the color burst and the $(E'_B)$ signals are almost in phase opposition. Consequently, the $(E'_B—E'_Y)$ signal supplied to lead 36 by demodulators 15 includes demodulated color bursts of negative polarity. Accordingly, in color television receivers designed for the reception of color television signals conforming to American broadcasting standards or equivalent standards, lead 49 preferably is connected to lead 36 so that the $(E'_B—E'_Y)$ signal is transmitted to unbalanced input terminal 48 of detector 45. In television systems conforming to other standards, it may be more desirable to supply one of the other two color signals to terminal 48 of the detector, or other means may be provided for supplying demodulated color bursts to terminal 48.

Figure 2:
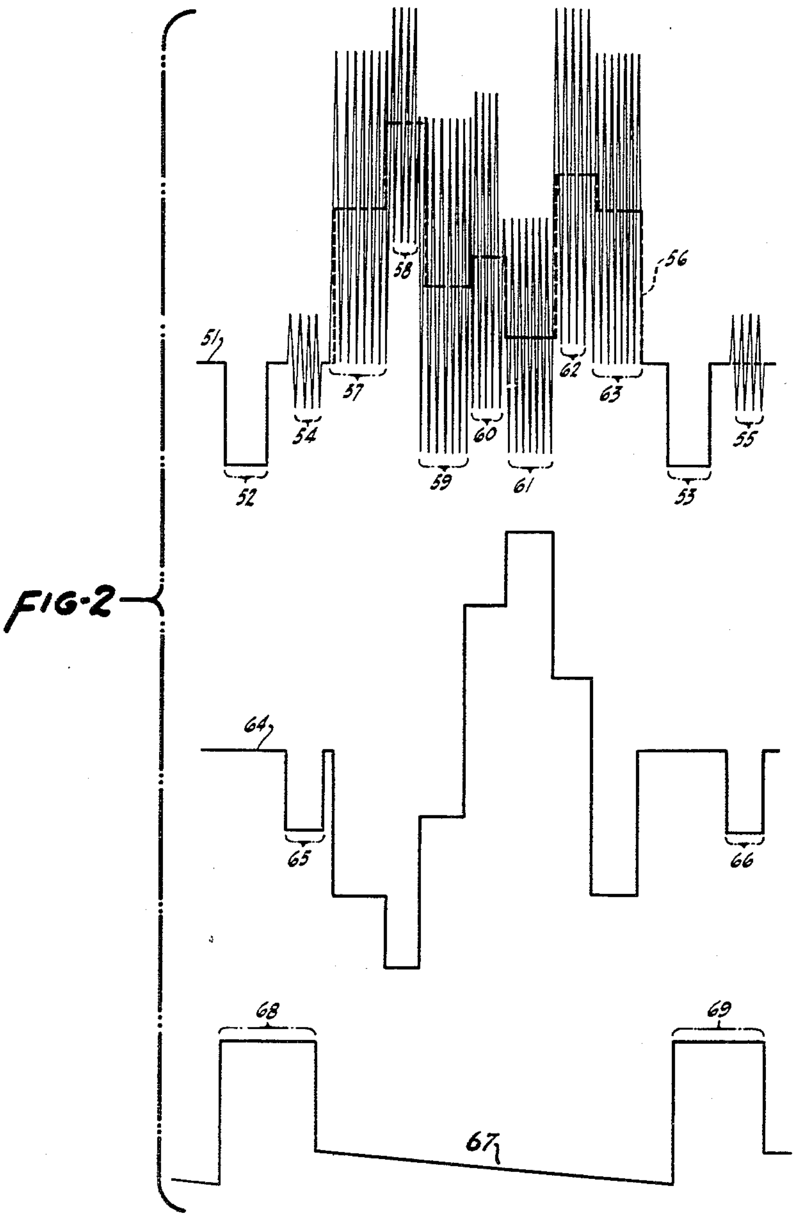
Fig. 2 is a group of curves representing electric waveforms that may be present at certain points in the circuit of a color television receiver.

Before proceeding with a more detailed description of the color killer apparatus, it may be helpful to consider briefly the curves shown in Fig. 2, which illustrate certain waveforms found at various points in a color television receiver circuit. Solid curve 51 represents a portion of a typical color television composite picture signal produced during transmission of a color bar pattern consisting of colored vertical bars arranged in the sequence green, yellow, red, magenta, blue, cyan and green. The composite picture signal includes horizontal synchronizing pulses 52 and 53 transmitted at a repetition rate corresponding to the line scanning frequency. Color bursts 54 and 55 are transmitted on the "back porch" of the horizontal synchronizing pulses for controlling the phase of oscillations produced by the subcarrier oscillator of the receiver. The color bursts are oscillations at the chrominance subcarrier frequency with a phase angle of 180 degrees relative to reference phase. The luminance components $(E'_Y)$ of the picture signal are represented by broken line 56. Chrominance components of the picture signal appear as oscillations at the chrominance subcarrier frequency modulated in amplitude and phase in accordance with the saturation and hue of the picture element. In the drawing, the number of chrominance subcarrier oscillations has been reduced for clarity. Portion 57 of the picture signal represents a green color bar, portion 58 represents a yellow color bar, portion 59 represents a red color bar, portion 60 represents a magenta color bar, portion 61 represents a blue color bar, portion 62 represents a cyan color bar, and portion 63 represents another green color bar.

Curve 64 of Fig. 2 represents the $(E'_B—E'_Y)$ signal supplied to leads 36 and 49 by demodulators 15. For purposes of the present invention, the important thing to note about curve 64 is that the demodulated color bursts appear as negative pulses 65 and 66.

Curve 67 represents a voltage signal supplied by horizontal oscillator 21 across horizontal output transformer 22. This signal includes flyback pulses 68 and 69 that are synchronized with the horizontal synchronizing pulses 52 and 53. When a voltage having a waveform similar to curve 67 is applied to the horizontal deflection coil of deflection yoke 25, a sawtooth waveform current is produced through the horizontal deflection coil to provide line scanning of the raster area on the screen of the picture tube. Since these waveforms are generated by conventional apparatus well known to those skilled in the art, any further description thereof would be superfluous.

Figure 3:
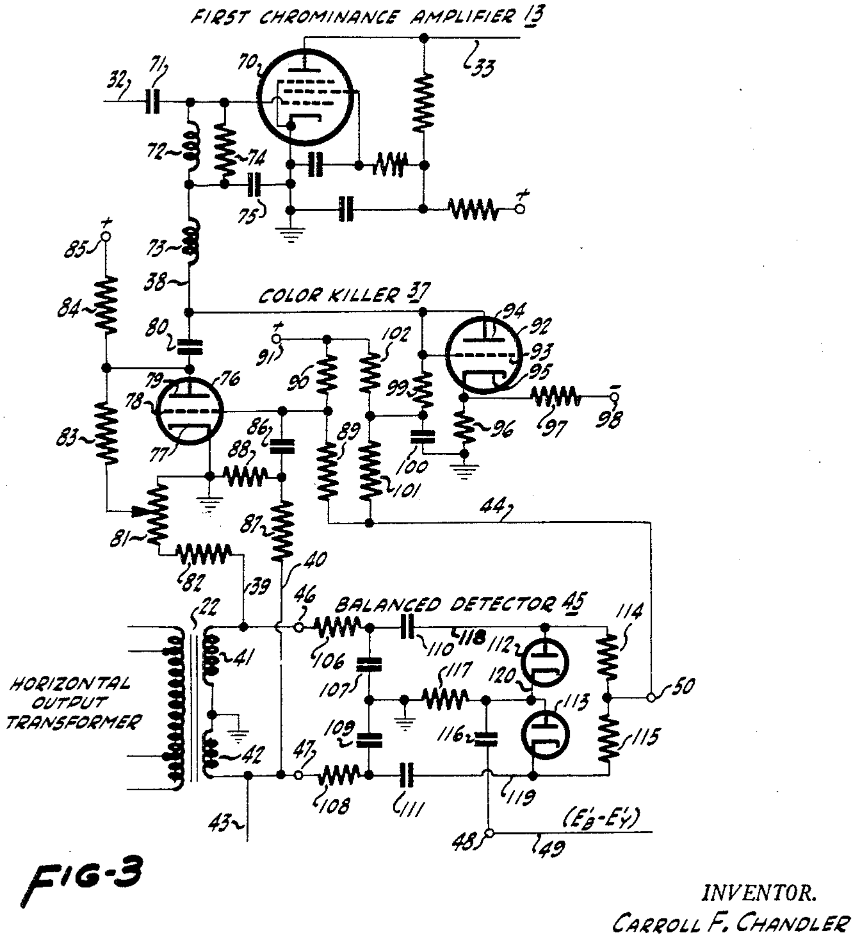
Fig. 3 is a fragmentary simplified circuit diagram of a portion of the receiver shown in Fig. 1, illustrating typical circuits of the first chrominance amplifier, color killer and balanced detector.

Reference is now made to Fig. 3 of the drawings, which is a simplified circuit diagram of the first chrominance amplifier 13, the color killer 37, and the balanced detector 45. Amplifier 13 may be a conventional amplifier stage incorporating an electron discharge device such as pentode vacuum tube 70. The first grid or control electrode of tube 70 is connected to lead 32 through a capacitor 71, and is connected to lead 38 through a bias circuit consisting of inductors 72 and 73, a grid leak resistor 74, and a capacitor 75, connected as shown. Chrominance components of the picture signal are transmitted from lead 32 through capacitor 71 to tube 70, while the bias circuit 72—75 acts as a filter to prevent transmission of the chrominance components to lead 38. On the other hand, low-frequency bias signals are transmitted from lead 38 through the bias circuit 72—75 to the control electrode of tube 70, so that a sufficiently negative bias voltage supplied to lead 38 cuts off tube 70 and prevents the transmission of signals by amplifier 13.

Color killer 37 includes an electron discharge device, such as triode vacuum tube 76, having a cathode 77, a control electrode 78, and an anode 79. Cathode 77 is connected to ground or its circuit equivalent, and anode 79 is connected to lead 38 through a capacitor 80. A potentiometer 81 and a resistor 82 are connected in series between ground and lead 39. Potentiometer 81 has an adjustable tap that is connected through a resistor 83 to anode 79. A resistor 84 is connected between anode 79 and a source of positive potential, about 200 volts, for example, represented in the drawing by terminal 85. A capacitor 86 and a resistor 87 are connected in series as shown between control electrode 78 and lead 40. A resistor 88 is connected between ground and the connection between capacitor 86 and resistor 87, as shown. A resistor 89 is connected between control electrode 78 and lead 44. A resistor 90 is connected between control electrode 78 and a source of positive potential, about 200 volts, for example, represented in the drawing by terminal 91.

Color killer 37 also includes a clamp circuit comprising a diode rectifier which may be a triode vacuum tube 92 having its control electrode 93 connected directly to its anode 94. The cathode 95 of tube 92 is connected to ground or its circuit equivalent through a resistor 96, and is connected through a resistor 97 to a source of negative potential, about —12 volts, for example, represented in the drawing by terminal 98. Control electrode 93 and anode 94 are connected to ground through a resistor 99 and a capacitor 100 is connected in series as shown. The connection between resistor 99 and capacitor 100 is connected to lead 44 through a resistor 101, and is connected to terminal 91 through a resistor 102.

Figure 4:
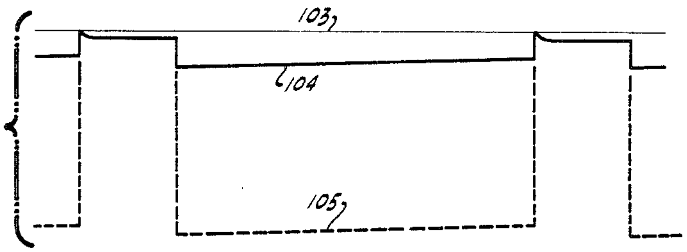
Fig. 4 is a group of curves representing bias voltages supplied by the color killer to the first chrominance amplifier.

Operation of the color killer may best be understood by reference to the curves shown in Fig. 4. In Fig. 4, horizontal solid line 103 represents zero potential, solid curve 104 represents the waveform of a bias voltage supplied by the color killer to lead 38 during the reception of color television signals, and broken curve 105 represents the waveform of the bias voltage supplied by the color killer to lead 38 during reception of monochrome television signals.

Referring now to Figs. 3 and 4, assume that a sufficiently negative control voltage is supplied through lead 44 to control electrode 78 to cut off tube 76, as is the case during reception of color television pictures, as will hereinafter be more fully explained. In synchronism with the horizontal flyback pulses, secondary 41 of the horizontal output transformer supplies positive electric pulses to the color killer through lead 39 and supplies negative electric pulses to the color killer through lead 40. Since the tube 76 is cut off under the assumed conditions, the negative pulses have no effect upon the color killer at this time.

The positive pulses are transmitting through resistor 82, a portion of potentiometer 81, resistor 83 and capacitor 80 to lead 38. However, the maximum positive potential that lead 38 can have is established by the clamp circuit including tube 92, since tube 92 conducts current whenever its anode becomes more positive than its cathode. Consequently, the peaks of the positive pulses supplied to lead 38 are held at a value slightly below zero potential, as is represented by curve 104 of Fig. 4. During intervals between the positive pulses, lead 38 is maintained at a negative potential that is related in value to the amplitude of the pulses supplied to lead 38. This potential establishes the bias voltage supplied to the control electrode of tube 70 during the reception of color television signals, and can be adjusted by adjusting the position of the tap of potentiometer 81. Current flowing from the source of positive potential at terminal 91 through resistors 102 and 99 to lead 38 insures that the peaks of the positive pulses will not fall below the level established by tube 92, and prevents the negative bias supplied to the amplifier tube 70 from becoming larger in magnitude than is desired.

Now assume that the control voltage supplied to the color killer through lead 44 is substantially zero, as is the case during reception of monochrome television signals. Under these conditions, tube 76 is conductive during intervals between the electric pulses supplied to leads 39 and 40 by the horizontal output transformer, and electric current flows from the positive potential source at terminal 85 through resistor 84 and tube 76. In synchronism with the horizontal flyback pulses, secondary 42 of the horizontal output transformer supplies a negative electric pulse through lead 40, resistor 87 and capacitor 86 to the control electrode 78 of tube 76, and these negative pulses abruptly cut off tube 76. When tube 76 is cut off, its anode potential rises, and as a result relatively large positive pulses are transmitted through capacitor 80 to lead 38.

The clamp circuit including tube 92 establishes the potential of lead 38 at the positive peaks of the pulses supplied thereto, so that between these pulses the bias voltage supplied through lead 38 to the control electrode of tube 70 has a relatively large negative value, as is indicated by curve 105 of Fig. 4. Consequently, tube 70 is cut off during intervals between the flyback pulses, and no noise or other signals can be transmitted by the chrominance channel during the active portion of a horizontal scanning line while monochrome television signals are being received. During the flyback portion of a horizontal scanning line, however, which corresponds to a positive peak of the pulses supplied to lead 38, tube 70 is conductive so that color bursts can be transmitted through the chrominance channel whenever the receiver is tuned to receive a color television signal.

The control voltage is supplied to lead 44 by balanced detector 45. Again referring to Fig. 3, the balanced detector includes a series resistor 106 and a shunt capacitor 107, forming a first integrating circuit, connected to its input terminal 46, and a series resistor 108 and a shunt capacitor 109, forming a second integrating circuit, connected to its input terminal 47. A capacitor 110 is connected in series with resistor 106, and a capacitor 111 is connected in series with resistor 108, as shown. Two half-wave rectifiers, which may be diode vacuum tubes 112 and 113, are connected in series with like polarities between capacitors 110 and 111. Two load resistors 114 and 115 are also connected in series between capacitors 110 and 111, and are in parallel with rectifiers 112 and 113. A series capacitor 116 and a shunt resistor 117, forming a differentiating circuit, are connected to input terminal 48, as shown. The connection between rectifiers 112 and 113 is connected to capacitor 116 and the connection between resistors 114 and 115 is connected to output terminal 50.

In synchronism with the horizontal flyback pulses and therefore in substantial synchronism with the color bursts transmitted on the "back porch" of the horizontal synchronizing pulses, secondary 41 of the horizontal output transformer supplies positive electric pulses to input terminal 46 of the balanced detector, and simultaneously therewith secondary 42 supplies negative electric pulses to input terminal 47 of the detector. The positive and negative pulses are not necessarily equal in amplitude. In fact, the positive pulses preferably are of somewhat greater amplitude than the negative pulses, for reasons hereinafter explained. For example, the positive pulses may have an amplitude of about 145 volts peak to peak, while the negative pulses may have an amplitude of about 100 volts peak to peak. This can be accomplished by providing more turns in secondary 41 than in secondary 42. The positive pulses are partially integrated by integrating circuit 106—107, which may have a time constant of about 3 microseconds. Similarly, the negative pulses are partially integrated by integrating circuit 108—109, which may also have a time constant of about 3 microseconds. The partially integrated positive pulses are supplied to capacitor 110, and the partially integrated negative pulses are supplied to capacitor 111.

Rectifiers 112 and 113 are of conductive polarity with respect to the pulses supplied to terminals 46 and 47, and conduct current during these pulses. This charges capacitors 110 and 111 so that, during intervals between the pulses, the connection 118 between capacitor 110 and rectifier 112 is maintained at a negative potential, while the connection 119 between capacitor 111 and rectifier 113 is maintained at a positive potential. Capacitors 110 and 111 discharge slightly through resistors 114 and 115 during intervals between the pulses, and the charge on the capacitors is restored by the conduction of current through rectifiers 112 and 113 during positive peaks of the pulses. By way of example, capacitors 110 and 111 may each have a value of about .01 microfarad, and resistors 114 and 115 may each have a value of about 1 megohm, so that the time constant of the capacitor discharge between pulses is in the order of 100th of a second. Since the line scanning period is only about 63.5 microseconds, the discharge of capacitors 110 and 111 between pulses is quite small in amount.

The potential of connection 120 between rectifiers 112 and 113 depends upon the signal supplied to unbalanced input terminal 48 of the detector through lead 49. When no signal is supplied to input terminal 48, the potential of lead 120 is substantially zero since this lead is connected to ground through resistor 117 and substantially equal amounts of current pass through the rectifiers 112 and 113 during the pulses supplied to terminals 46 and 47. During reception of color television signals, the $(E'_B—E'_Y)$ signal is supplied to terminal 48 through lead 49, and this signal is partially differentiated by the differentiating circuit consisting of capacitor 116 and resistor 117, which may, for example, have a time constant of about 2 microseconds. The partially differentiated $(E'_B—E'_Y)$ signal is supplied to and establishes the potential of connection 120 between the two rectifiers.

Figure 5:
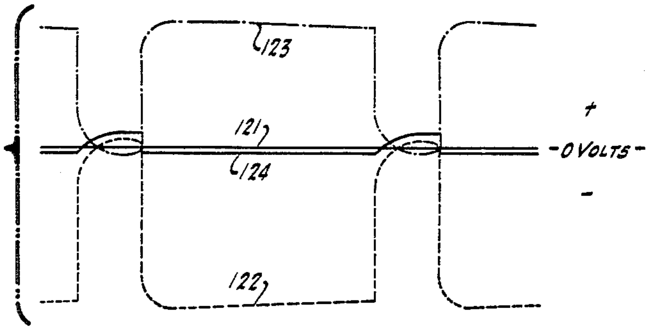
Fig. 5 is a group of curves representing electric waveforms at various points in the color killer during reception of strong monochrome television signals.

Now assume that a strong monochrome television signal having a high signal-to-noise ratio is being received. Since a monochrome television signal contains no chrominance components, the $(E'_B—E'_Y)$ signal has zero amplitude, and the potential of connection 120 is substantially zero and constant. Operation of balanced detector 45 under these conditions can best be understood by reference to the curves illustrated in Fig. 5. In Fig. 5, horizontal solid line 121 represents the potential of connection 120, which is substantially zero. Broken curve 122 represents the potential of connection 118, and illustrates the positive electric pulses supplied in synchronism with the horizontal flyback pulses by transformer secondary 41 through integrating circuit 106—107 and capacitor 110 to connection 118. Broken curve 123 represents the potential of connection 119, and illustrates the negative electric pulses supplied in synchronism with the horizontal flyback pulses by transformer secondary 42 through integrating circuit 108—109 and capacitor 111 to connection 119.

It will be noted that the amplitude of the positive pulses is somewhat greater than the amplitude of the negative pulses, due to the fact that there are more turns in secondary 41 than in secondary 42. The principal effect of the integrating circuit is to round off the corners of the pulses and accentuate the trailing edges of the pulses relative to the leading edges of the pulses, as is shown in Fig. 5. The slight slope of curves 122 and 123 between pulses represents the partial discharge of the capacitors 110 and 111 through resistors 114 and 115.

Solid curve 124 of Fig. 5 represents the potential at output terminal 50 of the balanced detector. Because resistors 114 and 115 constitute a voltage divider between connections 118 and 119, curve 124 lies almost midway between curves 122 and 123, but is slightly positive with respect to the true midpoint because of the small current flowing to terminal 50 from the positive voltage supply at terminal 91 through resistors 90 and 89. Furthermore, control electrode 78 is slightly more positive than detector terminal 50 because of a small voltage drop across resistor 89. However, the true midpoint between the potentials of leads 118 and 119 is a somewhat negative potential because of the difference in amplitude between the positive and negative pulses supplied to terminals 46 and 47. These factors are mutually compensating so that the potential of control electrode 78 is substantially zero during monochrome reception. In other words, because secondary 41 has more turns than secondary 42, the control voltage at terminal 50 is somewhat negative in the absence or substantial absence of an $(E'_B—E'_Y)$ color signal, so that the bias of tube 76 may conveniently be adjusted by selecting appropriate values of resistors 89 and 90 to set the color burst level at which the color killer will operate.

Whenever the potential of connection 118, represented by curve 122, is more positive than the potential at connection 120, represented by curve 121, current flows through diode rectifier 112. Since this current charges capacitor 110 and makes the potential at lead 118 more negative, the amount of current that rectifier 112 will conduct during each positive pulse is just sufficient to replace the small amount of charge lost by capacitor 110 between pulses by current through the resistors 114 and 115. As a result, the potential of lead 118 is maintained at such a value that rectifier 112 is conductive only during the most positive or peak portions of the positive electric pulses, and the potential of the positive peak is controlled by the potential of connection 120 during these positive peaks. This in turn, in combination with the pulse amplitude, controls the value of the negative potential at connection 118 between the positive pulses.

Similarly, diode rectifier 113 conducts current only when the potential of connection 119, represented by curve 123, is more negative than the potential at connection 120, represented by curve 121, so that the potential of connection 120 during negative peaks of the negative pulses, in combination with the amplitude of the negative pulses, controls the value of the positive potential at connection 119 between the pulses.

It is thus apparent that the potential at output terminal 50 is chiefly controlled by the value of the potential supplied to connection 120 through input terminal 48, and that similar signals of opposite polarity supplied simultaneously to input terminals 46 and 47 have little effect upon the potential of output terminal 50. Consequently, terminals 46 and 47 may be referred to as balanced input terminals of the detector, and terminal 48 may be referred to as an unbalanced input terminal. The potential at output terminal 50 of the balanced detector is supplied through lead 44 and resistor 89 to the control electrode of tube 76 in the color killer, and acts as a control voltage for cutting off the color killer during reception of color television signals.

The negative magnitude of the voltage at terminal 50 varies in almost exactly direct proportion to the amplitude of the color burst. When the received signal has large chrominance components including a large-amplitude color burst, a relatively large negative voltage is provided at terminal 50. A portion of this negative voltage is transmitted through resistors 101 and 99 to the bias circuit of tube 70, and reduces the amplification provided by tube 70. A chrominance-component automatic gain control is thus provided. The value of resistor 102 sets the operating range of the grid bias voltage for tube 70.

During monochrome reception, the value of the control voltage is substantially zero, as hereinbefore explained, and tube 76 is conductive during intervals between horizontal flyback pulses. In synchronism with the flyback pulses, tube 76 is cut off by negative pulses supplied to its control grid through lead 40. As a result, the chrominance channel of the receiver is cut off during intervals between the flyback pulses, and transmits signals only during horizontal flyback.

Now assume that a weak monochrome television signal having a small signal-to-noise ratio is being received. Operation of balanced detector 45 under these conditions can best be understood by reference to the curves shown in Fig. 6. Solid curve 121' represents the potential of connection 120 between the two diode rectifiers, broken curve 122' represents the potential of connection 118, broken curve 123' represents the potential of connection 119, and solid curve 124' represents the control voltage provided at output terminal 50 of the detector.

During horizontal flyback, tube 70 of the first chrominance amplifier is conductive, and noise is transmitted through the chrominance channel of the receiver. This noise has no appreciable effect upon the picture quality, since the picture tube is blanked during flyback. However, noise bursts are transmitted through demodulators 15 during flyback, and these noise bursts are transmitted through lead 49 to connection 120 of the balanced detector. Consequently, the potential at connection 120 of the detector has a waveform such as that represented by curve 121'.

Figure 6:
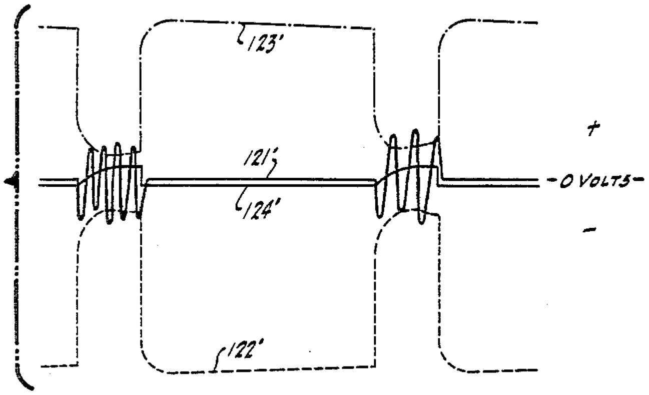
Fig. 6 is a group of curves representing electric waveforms in the color killer during reception of weak monochrome television signals.

The potential at connection 118 of the detector, represented by curve 122', is now established by the negative peaks of the noise bursts, and the potential at connection 119, represented by curve 123' is established by the positive peaks of the noise bursts. As a result, curves 122' and 123' of Fig. 6 are somewhat further apart than curves 122 and 123 of Fig. 5, but this displacement of curves 122' and 123' is substantially symmetrical with respect to zero potential, and consequently the value of the control voltage at output terminal 50 of the detector, represented by curve 124', remains substantially zero. It is thus apparent that the value of the control voltage is relatively independent of noise transmitted through the chrominance channel of the receiver. Because of this fact, the color killer operates reliably to cut off the chrominance channel during reception of weak monochrome signals having small signal-to-noise ratios, as well as during reception of strong monochrome television signals having large signal-to-noise ratios.

Figure 7:
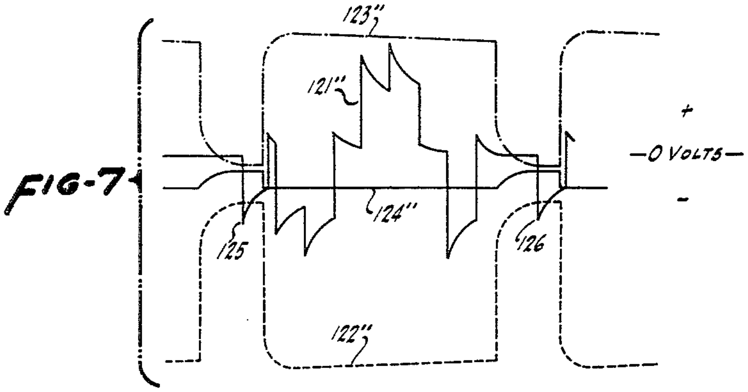
Fig. 7 is a group of curves representing electric waveforms in the color killer during color television reception.

Operation of balanced detector 45 during reception of color television signals can best be understood by reference to the curves of Fig. 7. During color reception, a $(E'_B—E'_Y)$ signal, which may have a waveform similar to that represented by curve 64 of Fig. 2, is transmitted through lead 49 to unbalanced input terminal 48 of the balanced detector. This signal is partially differentiated by the differentiating circuit 116—117, and the resulting signal supplied to connection 120 of the balanced detector may have a waveform such as that represented by curve 121'' of Fig. 7. Curve 122'' of Fig. 7 represents the potential of connection 118 of the detector, curve 123'' represents the potential of connection 119 of the detector, and curve 124'' represents the control voltage provided at output terminal 50 of the detector.

It will be noted that curve 121'' includes negative pulses 125 and 126 derived from the demodulated color bursts. The negative peaks of pulses 125 and 126 establish the value of positive potential at connection 118, and as a result curves 122'' and 123'' are displaced nonsymmetrically relative to zero potential. In consequence, the control voltage represented by curve 124'' has a substantial negative value, about 10 to 15 volts more negative than during monochrome reception, directly related to the amplitude of the color bursts, and this negative control voltage cuts off tube 76 of the color killer. Now the color killer is ineffective to cut off tube 70 of the first chrominance amplifier, and the chrominance channel transmits signals continuously during color television reception. During intervals between the horizontal flyback pulses, both of the diode rectifiers 112 and 113 are cut off by large reverse voltages, and the detector is unresponsive to the potential at connection 120. In effect, therefore, the detector is responsive only to the demodulated color burst portions of the $(E'_B—E'_Y)$ signal, and the amplitude of the color bursts determines the negative value of the control voltage.

Figure 8:
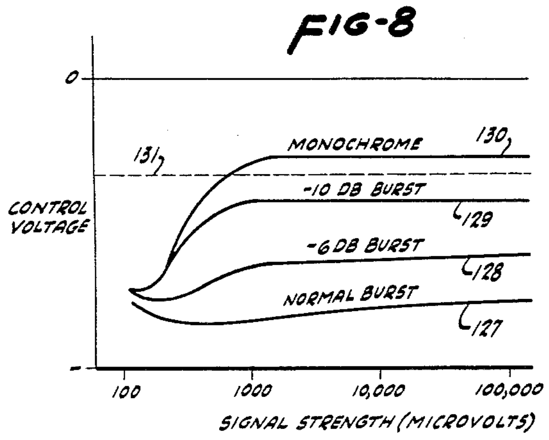
Fig. 8 is a group of curves representing relative values of the color killer control voltage in prior-art apparatus under various conditions of signal reception.
Figure 9:
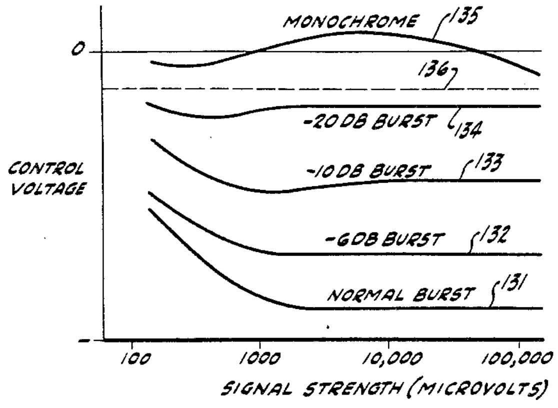
Fig. 9 is a group of curves representing relative values of the color killer control voltage in apparatus embodying the present invention.

Advantages of the present invention can best be appreciated by reference to the curves shown in Figs. 8 and 9. Fig. 8 is a group of curves showing relative values under various conditions of a control voltage derived from an asymmetric tap of color phase detector 17, which according to prior practice was used to control the operation of the color killer 37. Fig. 9 is a similar group of curves showing relative values under various conditions of the control voltage supplied to the color killer by balanced detector 45 in accordance with the present invention.

Referring now to Fig. 8, curve 127 represents the relative value of a control voltage derived from an asymmetric tap of color phase detector 17 as a function of signal strength of a color television signal received at antenna 1 when the amplitude of the color bursts has the normal or correct value relative to other components of the composite picture signals. However, in actual practice it has been found that the amplitude of the color bursts may be as much as 20 decibels below the normal value, even under conditions of good reception. Accordingly, curve 128 represents the value of the control voltage when the amplitude of the color bursts is 6 decibels below normal, and curve 129 represents the value of the control voltage when the amplitude of the color burst is 10 decibels below the normal value. Curve 130 represents the value of the control voltage during reception of a monochrome television signal.

Because the control voltage developed at an asymmetric tap of color phase detector 17 is influenced by noise accompanying the received signal, a relatively large control voltage is developed during reception of weak monochrome signals having a small signal-to-noise ratio, which is represented in Fig. 8 by the relatively large negative value of curve 130 at the left side of the figure. To insure that the color killer will be cut off during reception of color television signals having color bursts with amplitudes considerably less than normal, the control voltage value at which the color killer is cut off must be set at a relatively small negative value such as that represented by broken line 131 of Fig. 8.

Under these conditions, it is evident that the color killer will be cut off during reception of monochrome television signals when the strength of the signal received at antenna 1 is less than about 1000 microvolts. Consequently, automatic color killer apparatus heretofore employed has been inffective to cut off the chominance channel of the receiver during reception of weak monochrome signals having small signal-to-noise ratios, which is just the time when noise transmitted through the chrominance channel is most objectionable.

Fig. 9 represents relative values under various conditions of the control voltage supplied at the output terminal 50 of balanced detector 45. Curve 131 represents relative values of the control voltage during reception of color television signals having color bursts with a normal amplitude relative to other components of the composite picture signal. Curve 132 represents relative values of the control signal when the amplitude of the color bursts is 6 decibels below normal, curve 133 represents relative values of the control voltage when the amplitude of the color burst is 10 decibels below normal, and curve 134 represents relative values of the control voltage when the amplitude of the color burst is 20 decibels below normal. Curve 135 represents relative values of the control voltage during reception of monochrome television signals.

To insure that the color killer will be cut off during reception of color television signals even though the amplitude of the color bursts may be as much as 20 decibels below normal, the cut-off level of the color killer is set to a control voltage value such as that represented by broken line 136 of Fig. 9. This adjustment may be made, for example, by appropriate choice of values for resistors 89 and 90 and other circuit elements of the receiver. It will be noted from Fig. 9 that the control voltage during monochrome reception, represented in Fig. 9 by curve 135, is always more positive than the cut-off level represented by broken line 136. Consequently, the color killer is effective to cut off the chrominance channel during monochrome reception even though the received monochrome television signal may be of low strength and have a small signal-to-noise ratio.

It should be understood that this invention in its broader aspects is not limited to the specific embodiment herein illustrated and described, and that the following claims are intended to cover all changes and modifications that do not depart from the true spirit and scope of the invention. Although reference has herein been made to American color television broadcasting standards, such reference is by way of illustration only, and it will be understood that the invention is also applicable to color television receivers designed for television systems conforming to other standards.

What is claimed is:

1. In a color television receiver having a chrominance channel for transmitting chrominance signals and means for providing demodulated color bursts during reception of color television signals, the combination comprising a color killer circuit for cutting off said chrominance channel during reception of monochrome television signals, a balanced detector means to apply pulses of opposite polarity which are synchronized with the line scanning frequency to the opposite parts of the balanced detector, means to supply said demodulated color bursts also to the balanced detector so that opposite polarity pulses are combined with the demodulated color bursts, and means to apply biased signals developed from the comparison and combination of signals to render the color killer circuit inoperative during periods of reception of the color burst signals.

2. In a color television receiver having a chrominance amplifier and means for providing demodulated color bursts during reception of color television signals, the combination comprising a color killer circuit for supplying a bias voltage to cut off said chrominance amplifier during reception of monochrome television signals, a balanced detector, means to apply pulses of opposite polarity which are synchronized with the line scanning frequency to the two parts of balanced detector, means to supply to said demodulated color bursts for supplying a control voltage to cut off said color killer circuit during reception of color television signals.

3. In a color television receiver having a chrominance amplifier and a demodulator for supplying during reception of color television signals a $(E'_B—E'_Y)$ signal that is followed by demodulated color bursts, apparatus comprising a color killer circuit for supplying a bias voltage to cut off said chrominance amplifier during reception of monochrome television signals, a balanced detector responsive to the color burst portions only of said $(E'_B—E'_Y)$ signal for supplying a control voltage to cut off said color killer circuit during reception of color television signals.

4. In a color television receiver having a chrominance channel for transmitting chrominance singals, a color killer circuit for cutting off said chrominance channel during reception of monochrome television signals, comprising a detector for supplying a control voltage to bias said chrominance channel to an operative state during reception of color television signals, said detector having a pair of balanced input terminals and an unbalanced input terminal, means for supplying demodulated color bursts to said unbalanced input terminal during reception of color television signals, means for simultaneously supplying electric pulses of opposite polarity synchronously with the line scanning frequency to said balanced input terminals.

5. In a color television receiver having a chrominance channel for transmitting chrominance signals, means for providing horizontal flyback pulses, and a demodulator for providing demodulated color bursts during reception of color television signals, a color killer circuit for cutting off said chrominance channel during reception of monochrome television signals, comprising a detector having two balanced input terminals and one unbalanced input terminal, means for supplying a control voltage to cut off said color killer circuit during reception of color television signals, connections for supplying said demodulated color bursts to said unbalanced input terminal, and means for supplying electric pulses of opposite polarity to said balanced input terminals in synchronism with said horizontal flyback pulses so that the pulses applied to the balanced input terminals are compared with the demodulated color bursts and during reception of color signals the control voltage is developed.

6. In a color television receiver, a chrominance channel for transmitting chrominance signals, means for providing horizontal flyback pulses, a demodulator for providing demodulated color bursts during reception of color television signals, a color killer means for cutting off said chrominance channel during reception of monochrome television signals, two capacitors, two half-wave rectifiers connected in series with like polarities between said two capacitors, two resistors connected in series between said two capacitors, means for supplying electric pulses of opposite polarity to said two capacitors in synchronism with said horizontal flyback pulses, said rectifiers being of conductive polarity with respect to said electric pulses, connections for supplying said demodulated color bursts between said two rectifiers, whereby there is produced between said two resistors a control voltage related in value to the amplitude of said demodulated color bursts, and connections for supplying said control voltage to said color killer means to render the color killer means inoperative to cut off the chrominance channel during reception of color television signals.

7. In a color television receiver, a chrominance amplifier, a demodulator for supplying during reception of color television signals a color signal that includes demodulated color bursts of negative polarity, a transformer, means for supplying horizontal flyback pulses to said transformer, a color killer means for supplying a bias voltage to cut off said chrominance amplifier during reception of monochrome television signals, two capacitors, two diode rectifiers connected in series with like polarity between said two capacitors, two resistors connected in series between said two capacitors, circuit means connecting said two capacitors to points on said transformer whereat maximum voltage differences appear so that electric pulses of opposite polarity are supplied to respective ones of said capacitors in synchronism with said horizontal flyback pulses, said rectifiers being of conductive polarity relative to said electrical pulses, circuit means for supplying said color signal between said two rectifiers, whereby the flyback pulses are compared with the demodulated color bursts and there is produced between said two resistors a control voltage related in value to the amplitude of said demodulated color bursts, and circuit means for supplying said control voltage to said color killer means to cut off the color killer means during reception of color television signals.

8. In a color and monochrome television receiver, a chrominance channel, means for supplying demodulated color bursts during reception of color television signals, means for developing horizontal flyback pulses during receipt of television signals, a color killer means for cutting off said chrominance channel during reception of monochrome television signals, two integrating circuits, two capacitors connected to respective ones of said integrating circuits, two half-wave rectifiers connected in series with like polarities between said two capacitors, two resistors connected in series between two said capacitors, means for supplying electric pulses of opposite polarity to respective ones of said integrating circuits in synchronism with said flyback pulses, means for supplying said demodulated color bursts between said two rectifiers, whereby there is produced between said two resistors a control voltage related in value to the amplitude of said demodulated color bursts, and means for supplying said control voltage to said color killer means to cut off the color killer means during reception of color television signals.

9. Apparatus as defined in claim 8, in which each of said integrating circuits consists of a series resistor and a shunt capacitor.

10. In a television receiver for color and monochrome, a chrominance channel, means for producing from the chrominance channel demodulated color bursts during reception of color television signals, means for producing from the received television signals horizontal flyback pulses, means for cutting off said chrominance channel during reception of monochrome television signals, two capacitors, two half-wave rectifiers connected in series with like polarities between said two capacitors, two resistors connected in series between said two capacitors, means for supplying electric pulses of opposite polarity to respective ones of said capacitors in synchronism with said flyback pulses, a differentiating circuit, means for supplying said demodulated color bursts through said differentiating circuit to the connection between said two rectifiers, whereby there is developed at the connection between said two resistors a control voltage related in value to the amplitude of said demodulated color bursts, and means for supplying said control voltage to said color killer to cut off the color killer means during reception of color television signals.

11. Apparatus as defined in claim 10, in which said differentiating circuit consists of a series capacitor and a shunt resistor.

12. In a television receiver for color and monochrome, a color killer circuit comprising, two integrating circuits each including of a series resistor and a shunt capacitor, a differentiating circuit including a first series capacitor and a shunt resistor, second and third series capacitors connected in series with respective ones of said series resistors, two diode rectifiers connected in series with like polarity between said second and third series capacitors, said first series capacitor being connected to the connection between said rectifiers, two load resistors connected in series between said second and third series capacitors, means for supplying demodulated color bursts to said first series capacitor, means for supplying to respective ones of said series resistors electric pulses of opposite polarity substantially in synchronism with said color bursts, said rectifiers being of conductive polarity with respect to said electric pulses, whereby there is provided at the connection between said load resistors control voltage related in value to the amplitude of said color bursts and circuit means responsive to said control voltage to cut off the color killer circuit during the reception of color television signals.

13. In a color television receiver having a chrominance channel for transmitting chrominance signals, means for providing horizontal flyback pulses, a demodulator for providing demodulated color bursts during reception of color television signals, a color killer circuit operative to cut off said chrominance channel during reception of monochrome television signals, two capacitors, two half-wave rectifiers connected in series with like polarities between said two capacitors, first and second resistors connected in series between said two capacitors, a source of positive potential, a third resistor connected between said source of positive potential and a connection between said first and second resistors, means for supplying electric pulses of opposite polarity to said two capacitors in synchronism with said horizontal flyback pulses, said rectifiers being of conductive polarity with respect to said electric pulses, connections for supplying said demodulated color bursts to the connection between said rectifiers, whereby there is produced at the connection between said first and second resistors a control voltage related in value to the amplitude of said color bursts, and connections for supplying said control voltage to said color killer circuit to cut off the color killer effect and render the chrominance channel operative during reception of color television signals.

14. Apparatus as defined in claim 13, in which said pulses of opposite polarity consist of simultaneous positive and negative pulses, said positive pulses being of larger amplitude than said negative pulses.

15. In a color television receiver having a chrominance channel, bias connections for cutting off said chrominance channel, means for supplying demodulated color bursts during reception of color television signals, and means for supplying horizontal flyback pulses, apparatus comprising an electron discharge device having a cathode and a control electrode and an anode, means for supplying negative voltage pulses to said control electrode in synchronism with said flyback pulses, whereby positive electric pulses may be provided at said anode, circuit means for supplying said positive pulses to said bias connections, a clamp circuit for establishing the most positive potential that said bias connections can have, whereby a negative bias voltage is supplied to said bias connections for cutting off said chrominance channel between said positive pulses, a balanced detector for supplying a control voltage having a negative value related to the amplitude of said demodulated color bursts, and circuit means for supplying said control voltage to said control electrode, whereby said electron discharge device is cut off during reception of color television signals.

16. In a color television receiver having a chrominance amplifier, a bias circuit for said amplifier, a demodulator for supplying during reception of color television signals a ($E'_B$—$E'_Y$) color signal that includes demodulated color bursts of negative polarity, a transformer, and means for supplying horizontal flyback pulses to said transformer, apparatus comprising two capacitors, circuit connections between said transformer and said capacitors for supplying electric pulses of opposite polarity to respective ones of said two capacitors in synchronism with said flyback pulses, two diode rectifiers connected in series between said two capacitors, said rectifiers being of conductive polarity with respect to said electric pulses, two resistors connected in series between said two capacitors, circuit connections for supplying said ($E'_B$—$E_Y$) signal to the connection between said rectifiers, whereby there is provided at the connection between said resistors a control voltage having a negative value directly related to the amplitude of said demodulated color bursts, an electron discharge device having a cathode and a control electrode and an anode, connections for supplying said control voltage to said control electrode, whereby said electron discharge device is conductive during reception of monochrome television signals and is cut off during reception of color television signals, means for supplying to said electron discharge device electric pulses synchronized with said flyback pulses so that positive pulses are produced at said anode when said device is conductive, circuit means connecting said anode to said bias circuit, and a clamp circuit for establishing the most positive potential that said bias circuit can have, whereby a negative potential is applied to said bias circuit between said positive pulses and said amplifier is cut off during reception of monochrome pictures.

References Cited in the file of this patent

RCA Service Data 1954, T13, Model 21-CT-55; November 24, 1954 (pages 25-28).